(12) United States Patent
Edwards

(10) Patent No.: US 6,266,871 B1
(45) Date of Patent: Jul. 31, 2001

(54) MULTIPLE FASTENER APPLICATION

(75) Inventor: Kenneth Edwards, Leicester (GB)

(73) Assignee: Ariel Industries PLC (GB)

( * ) Notice: Subject to any disclaimer, the term of this patent is extended or adjusted under 35 U.S.C. 154(b) by 0 days.

(21) Appl. No.: 09/361,411

(22) Filed: Jul. 27, 1999

(30) Foreign Application Priority Data

Jul. 30, 1998 (GB) .................................................. 9816472

(51) Int. Cl.⁷ ..................................................... B23Q 7/10
(52) U.S. Cl. ........................ 29/818; 29/525.01; 29/34 B; 29/798; 29/243.53
(58) Field of Search ................................... 29/432.1, 505, 29/525.01, 525.06, 34 B, 798, 243.53, 788, 818; 227/53; 221/28, 302

(56) References Cited

FOREIGN PATENT DOCUMENTS

| 0567240 | * | 10/1993 | (GB) . | |
|---|---|---|---|---|
| 0018269 | * | 2/1977 | (JP) | ................................... 29/243.53 |
| 9628266 | * | 9/1996 | (WO) . | |

* cited by examiner

*Primary Examiner*—S. Thomas Hughes
*Assistant Examiner*—Jermie E. Cozart
(74) *Attorney, Agent, or Firm*—Ira S. Dorman

(57) ABSTRACT

Multiple fasteners are fed to a workpiece from a flexible carrier tape (2) in which the fasteners are mounted. The carrier tape passes through a guide and indexing means to bring a fastener into axial alignment with a plunger and, optionally, a die. The fasteners are pre-loaded in the carrier tape in a pattern which simultaneously brings a fastener into axial alignment with a plunger and a die at each of a plurality of fastening positions relative to the workpiece.

17 Claims, 6 Drawing Sheets

MULTIPLE FASTENER APPLICATION

This invention relates to a method of and an apparatus for simultaneously feeding multiple fasteners to a workpiece. The invention can be used, for example, to apply fasteners which have a shank and an enlarged head, and is particularly useful where the space between fastening points is inadequate to allow simultaneous access for individual fastener feed mechanisms and/or where the fastening points lie in a number of different planes.

DESCRIPTION OF PRIOR ART

Fastener application machines for applying single fasteners in sequence are well known. Such fastener application machines can be mounted in groups to apply a plurality of fasteners simultaneously, but each machine requires space around an axis along which the fasteners are to be applied to a workpiece, the space being required to mount a fastener feed mechanism, a plunger actuating mechanism and, where required, a setting die support means. Even if the frames of the machines are merged such that one frame can support a plurality of plungers and dies, an individual fastener feed mechanism is required for each fastening point.

There are numerous industrial applications, such as the assembly of side walls for heavy vehicle trailers, in which the required fastener spacing is less than the minimum spacing obtainable with fastening machines according to current practice. Trailer side walls are typically 15 meters long and 3 meters high, and are built in sections which are fastened together with twin-rows of rivets with the rows being 50 mm apart and the pitch of the rivets within the rows may be less than 40 mm. For minimum cost production all the rivets in both rows should be fed and set simultaneously, but due to the limited space available between the rivets this is not possible with currently available fastener application machines.

OBJECT OF THE INVENTION

It is therefore an object of the present invention to provide a method of and an apparatus for feeding fasteners to a workpiece which overcome the above disadvantages.

SUMMARY OF THE INVENTION

According to one aspect of the present invention there is provided a method of feeding multiple fasteners to a workpiece in which the fasteners are mounted in a flexible carrier tape which passes through a guide and indexing means to bring a fastener into axial alignment with a plunger, wherein the fasteners are pre-loaded in the carrier tape in a pattern which simultaneously brings a fastener into axial alignment with a plunger at each of a plurality of fastening positions relative to the workpiece.

Such a method allows simultaneous application of multiple fasteners in situations where the distance between fastening points is significantly less than can be achieved by current fastener application practice.

Preferably, the carrier tape simultaneously brings a fastener into axial alignment with a plunger and a die at each of the plurality of fastening positions.

The distance between each fastener is ideally a multiple of a predetermined unit spacing. The tape indexing means is preferably adapted to index the carrier tape at successive indexes by a variable distance which is a multiple of the predetermined unit spacing. The guide may create a path length between each of the plurality of fastening positions which is an integral multiple of the predetermined unit spacing.

The carrier tape may be pre-loaded with fasteners in a pattern of spacing identical to the pattern of spacing of the fastening positions. Moreover, the carrier tape may be pre-loaded with a plurality of patterns of fasteners, the fasteners of one pattern being interspersed between the fasteners of another pattern.

The carrier tape is ideally flexible about an axis transverse to the longitudinal direction of the tape and/or about an axis parallel to the longitudinal direction of the tape. In this way it is possible to bring the fasteners to any desired fastening points in any plane.

According to another aspect of the present invention there is provided an apparatus for applying multiple fasteners to a workpiece, wherein the apparatus comprises a guide manifold which includes:

a top plate having mounted therein a plurality of plungers which are axially aligned with a plurality of fastening positions;

at least one tape guide adapted to guide at least one tape carrying fasteners such that the fasteners are axially aligned with the fastening positions; and at least one tape indexing means adapted to bring a fastener into axial alignment with the plunger at each of the fastening positions.

The apparatus may include a bottom plate provided with a plurality of dies which are axially aligned with the plurality of fastening positions. The bottom plate may be mounted on a bottom platen of a power press.

The top plate may be adapted for movement with a top platen of a power press.

Alternatively, the top plate and the bottom plate may comprise the top and bottom platens of a power press.

The tape indexing means may be adapted to index the carrier tape at successive indexes by a variable distance which is a multiple of a predetermined unit spacing. The tape guide may create a path length between each of the plurality of fastening positions which is an integral multiple of the predetermined unit spacing.

The fastening positions may lie substantially in a straight line.

Clamping means may be provided for pre-clamping the workpiece prior to fastener application.

The guide manifold may be mounted on a prime mover in a manner which permits limited positional freedom relative to the prime mover, whereby the guide manifold can engage positioning means to bring the plungers into precise axial alignment relative to the fastening positions.

The plungers may be adapted to urge the fasteners from the carrier tape into delivery tubes for guiding the fasteners to the required fastening positions. The delivery tubes may incorporate an axially continuous longitudinal constriction to restrain the fasteners from free-fall and for preserving a desired fastener orientation. Such delivery tubes are described in EP-A-0 567 240. The delivery tubes may be adapted to receive the fasteners head-first from the carrier tape. The guide manifold may incorporate an aperture between the delivery tubes and the dies to permit the passage of a workpiece with sufficient clearance to allow the workpiece to be lifted clear of the dies after the fasteners have been applied.

For a better understanding of the present invention and to show more clearly how it may be carried into effect reference will now be made, by way of example, to the accompanying drawings in which:

DESCRIPTION OF PREFERRED EMBODIMENTS

Figure 1:
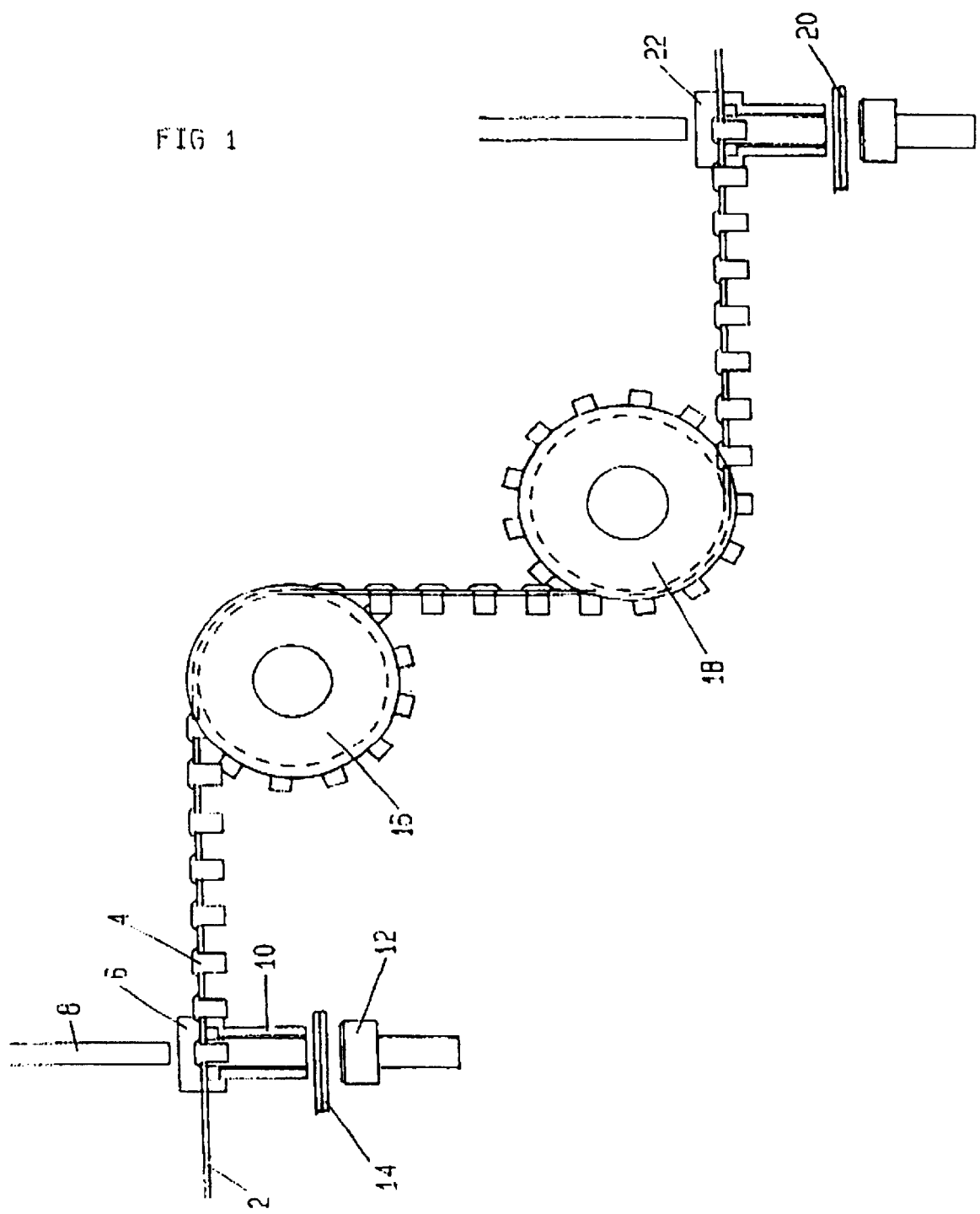
FIG. 1 is a diagrammatic illustration of part of one embodiment of a multiple fastener application system according to the present invention, the fasteners being applied in different planes.

FIG. 1 shows schematically a flexible carrier tape 2 loaded with fasteners 4, the tape passing through a first fastening station 6 comprising a plunger 8, a delivery tube 10 and a setting die 12 for applying a fastener 4 from the tape 2 to a workpiece 14. After passing through the fastening station 6 the carrier tape 2 is carried over tape indexing means in the form of first and second indexing wheels 16 and 18 which bend the flexible carrier tape 2 about an axis transverse to the longitudinal direction thereof to bring the carrier tape and the fasteners into line with a second fastening station 22, similar to the fastening station 6, at which a further fastener 4 is applied from the tape 2 to a workpiece 20 simultaneously with the fastener being applied to the workpiece 14. The workpiece 14 may comprise part of the same component as workpiece 20 or not as required. The fasteners 4 are pressed from the carrier tape 2 by means of the plunger 8 and urged into a bore of the delivery tube 10 and onwards into engagement with the workpiece 14 or 20 which is in use clamped between the delivery tube and the setting die 12. The plunger 8, die 12 and the fastening position are all axially aligned. The delivery tube 10 provides preclamping of the workpiece against the setting die 12 prior to fastener application. The fasteners 4 are pre-loaded into the carrier tape 2 in an arrangement such that the distance between each fastener is a multiple (1 or more) of a predetermined spacing unit. The indexing wheels 16, 18 are provided with positioning pins which engage pre-formed locating holes in the carrier tape for indexing the carrier tape 2 at successive indexes by a distance which is a selected multiple (1 or more) of the predetermined unit spacing to bring a fastener into axial alignment with the fastening positions.

Such flexible carrier tapes, extruded from plastics materials such as polypropylene, have been used for many years for feedings fasteners, such as rivets, to single point applications. The fasteners are secured in the tape by insertion into pre-formed holes which provide an interference fit on the shanks of the fasteners. To minimise the length of tape required, the fasteners are spaced along the length of the tape at equal spacings as close as is practicable for the purposes of indexing the tape and discharging the fasteners. It is desirable to have a standard (predetermined) spacing for each fastener shank diameter because each different spacing requires high cost press tooling for piercing the fastener retaining holes in the carrier tape and high cost insertion equipment for loading fasteners into the holes in the carrier tape. In this specification the term "unit spacing" is used to define a standard spacing.

The delivery tube 10 may incorporate an axially continuous longitudinal constriction to restrain the fasteners 4 from free-fall and for preserving a desired fastener orientation. Such delivery tubes are described in EP-A-0 567 240. The delivery tubes 10 may be adapted to receive the fasteners head-first from the carrier tape 2. Fasteners received in this manner can be used by moving the delivery tube laterally or by pivoting the delivery tube as described in WO-A-962 66. Expelling fasteners from the carrier tape head first avoids damaging the carrier tape in the manner that would occur if the heads of the fasteners were to pass through the tape, and hence the tape can be re-used many times.

The fastener may be any suitable form of fastener including fasteners which do not require a setting die and fasteners which do require a setting die. Fasteners which do require a setting die include solid, bifurcated, semi-tubular and tubular rivets which may be self-piercing or may require pre-formed holes.

Figure 2:
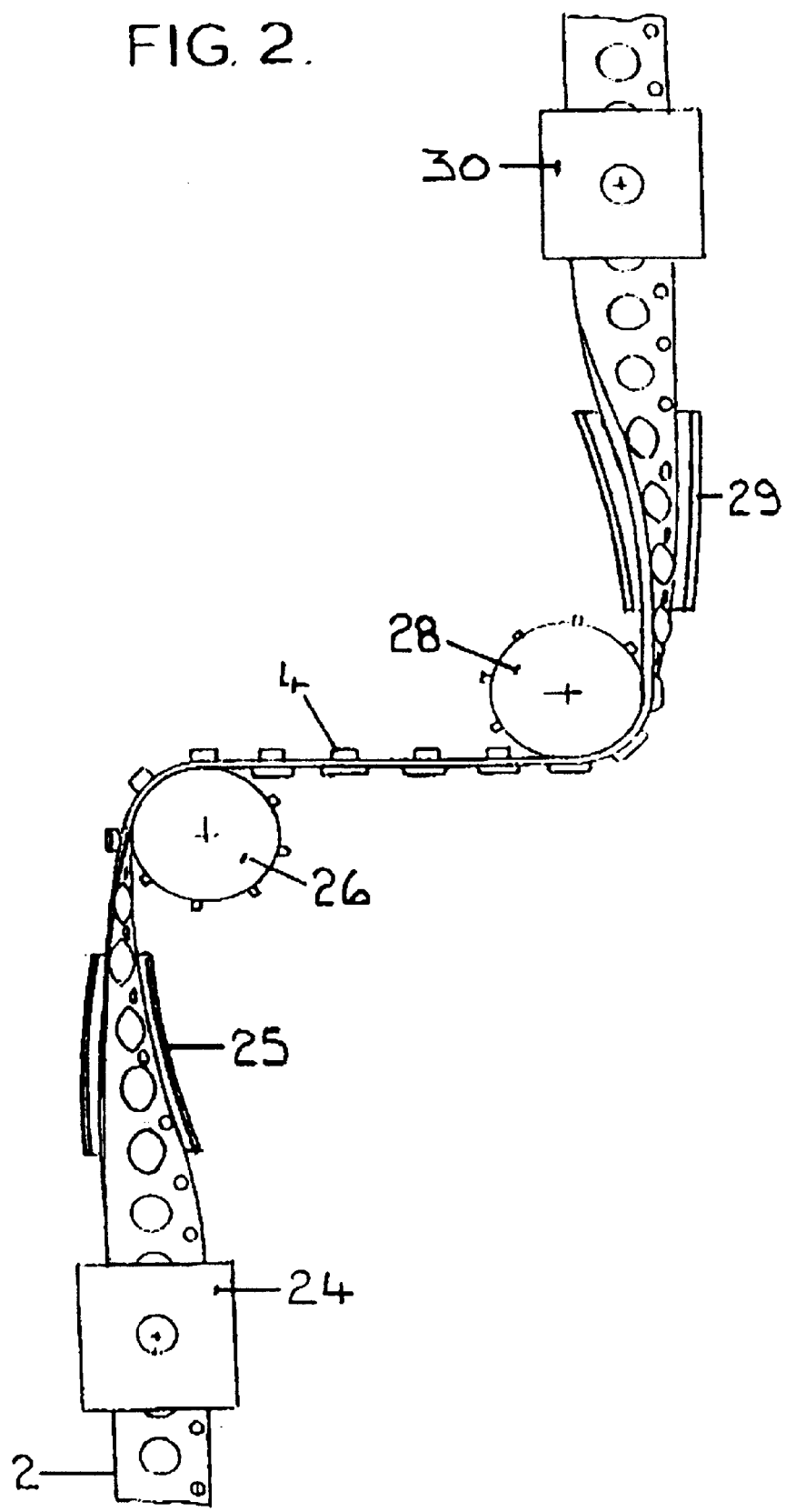
FIG. 2 is a diagrammatic illustration of part of another embodiment of a multiple fastener application system according to the present invention, the fasteners being applied at different locations in a single plane.

FIG. 2 shows schematically a flexible carrier tape 2 loaded with fasteners 4, the tape passing through a first fastening station 24 (similar to the fastening station 6 of FIG. 1) for applying a fastener 4 from the tape 2 to a workpiece (not shown). After passing through fastening station 24 the tape passes through a guide 25 which rotates the flexible carrier tape 2 about an axis parallel to the longitudinal axis of the tape to bring the same into engagement with a first indexing wheel 26 which generates a bend in the tape 2 about an axis transverse to the longitudinal direction of the tape to bring the same into engagement with a second indexing wheel 28 which generates a bend in the tape in a direction transverse to the longitudinal direction thereof prior to the tape passing through a guide 29 which causes the tape to rotate about an axis parallel to the longitudinal direction thereof. Thereafter the tape passes through a second fastening station 30 (similar to the fastening station 6 of FIG. 1) at which a further fastener 4 is applied from the tape 2 to a workpiece (not shown) simultaneously with the fastener being applied at the first fastening station 24.

Figure 3:
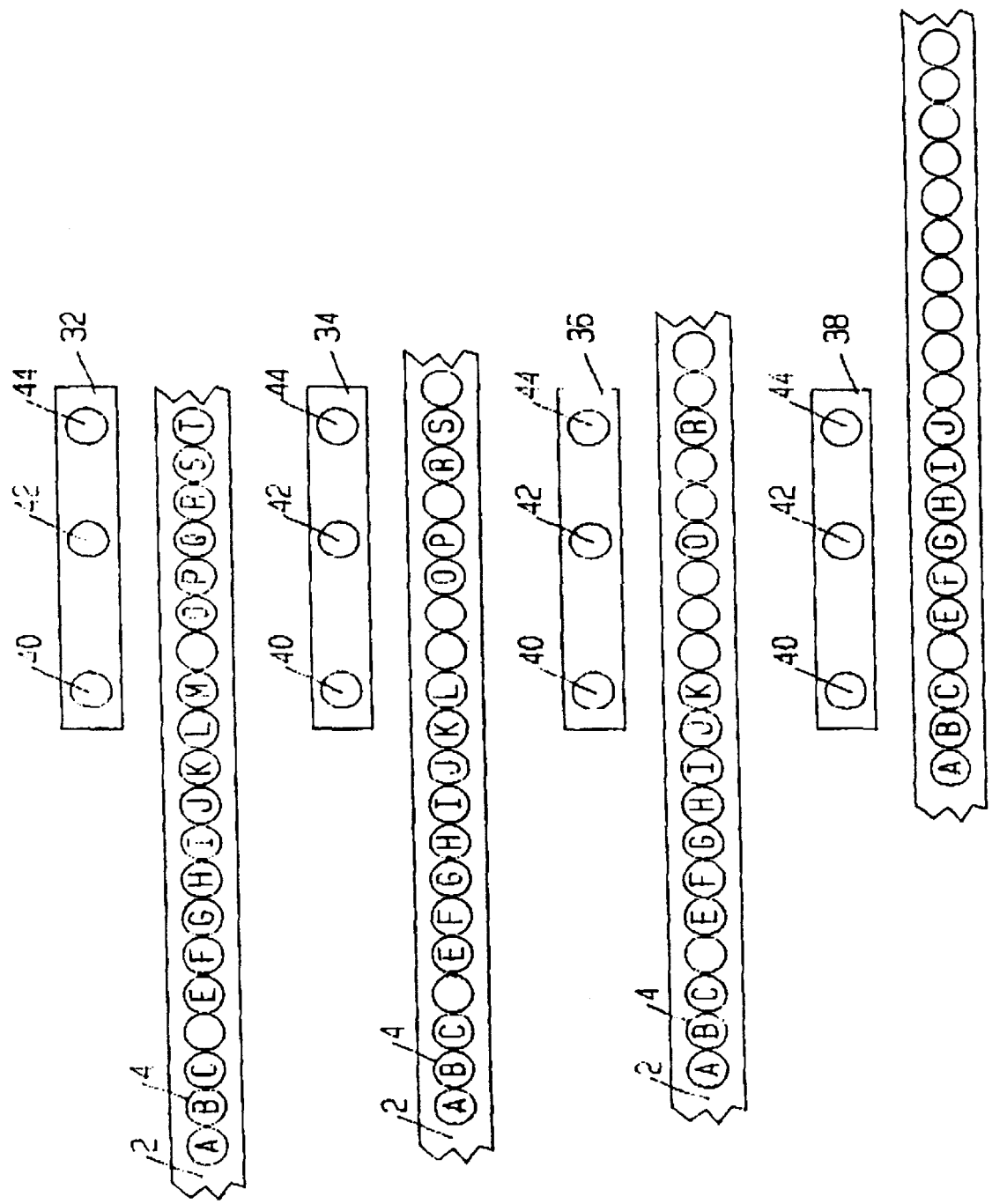
FIG. 3 is a schematic illustration of a multiple fastener application system in which a carrier tape is loaded with a plurality of interspersed patterns of fasteners.

The multiple fastener application system shown in FIG. 3 illustrates a typical example of fasteners 4 mounted in carrier tape 2 at minimum practical spacings, the fasteners 4 being used to fasten in sequence four identical components 32, 34, 36 and 38. For the purposes of illustration, the distance between fastening points 40 and 42 is four unit spacings, while the distance between fastening points 42 and 44 is three unit spacings. In this embodiment, for maximum utilisation of tape the pattern of fastener loading is nine consecutive fasteners 4 followed by one empty hole. For clarity, each of the holes in the carrier tape 2 has been allocated a letter.

A first component 32 is fastened by fasteners M, Q and T which are in a straight-line pattern of spacing identical to the pattern of spacing of the intended fastening points. The carrier tape 2 is then indexed forward by one unit spacing (by means of a tape indexing means as described in relation to FIG. 1 above or as described in more detail hereinafter), component 32 is replaced by component 34 and component 34 is fastened by fasteners L, P and S. Carrier tape 2 is again indexed forward by one unit spacing, component 34 is replaced by component 36 and component 36 is fastened by fasteners K, O and R. Thus the fasteners of one pattern (say L, P, S) are interspersed between the fasteners of another pattern (say M, Q, T). After the three components 32, 34 and 36 have been fastened, all the fasteners in positions K onwards will have been used. The tape is therefore indexed forward by eight unit spacings to bring fasteners C, G and J to the fastening points on a component 38 which has replaced component 36, and so on.

Thus the use of a tape indexing mechanism which can index varying distances permits a tape utilisation of 90 percent even though the fastening points are not equispaced.

Figure 4:
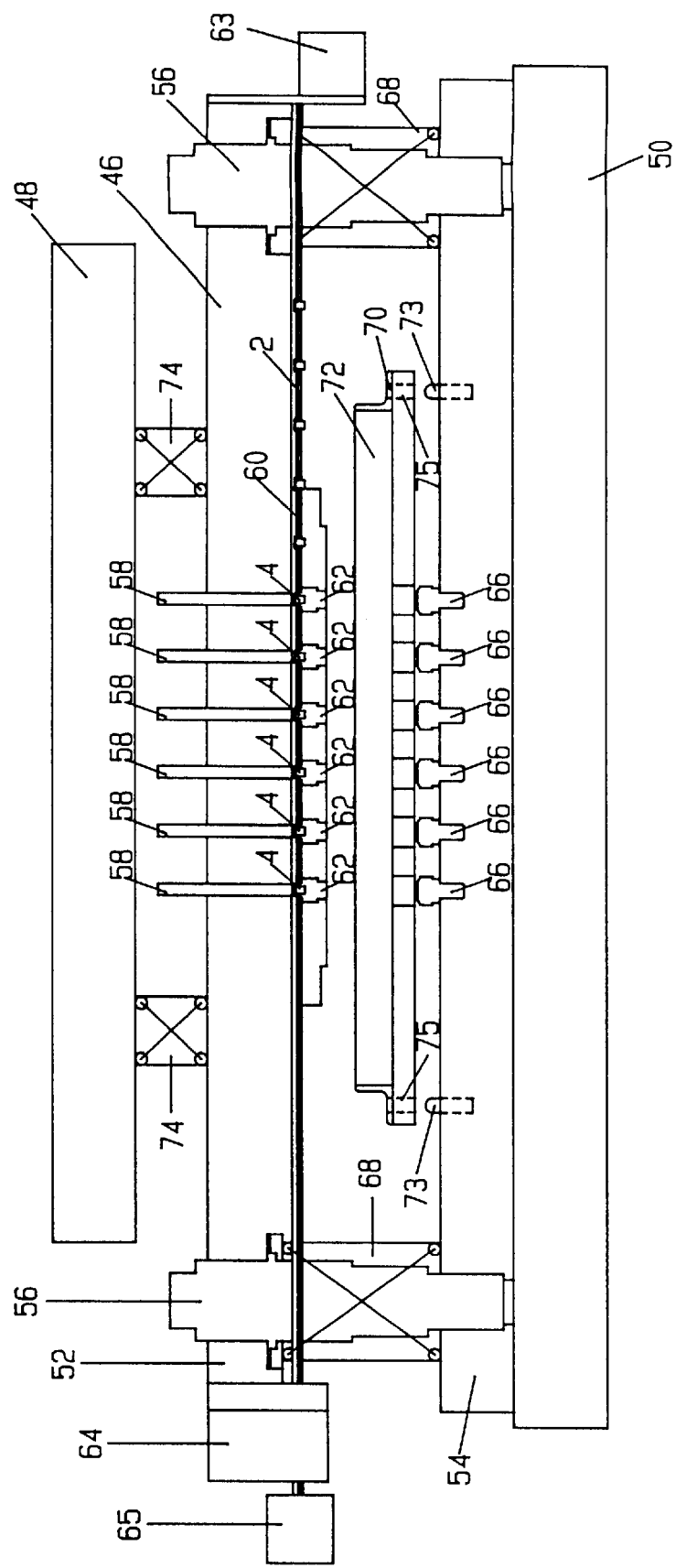
FIG. 4 is a schematic side view of an embodiment of a multiple fastener application system according to the present invention.

The multiple fastener application system shown in FIG. 4 comprises a guide manifold 46 extending within a space defined between a top platen 48 and a bottom platen 50 of a power press. A top plate 52 and a bottom plate 54 of the guide manifold 46 are interconnected by guide bushes 56. Mounted on the top plate 52 is a plurality of plungers 58, tape guides 60 and delivery tubes 62 (similar to the plunger 8 and delivery tubes 10 of FIG. 1, and tape guide 24 of FIG. 2). The tape is fed into tape guides 60 from a tape reel 63 and is indexed through the tape guides by indexing means 64 which incorporates a programmable motor. The empty tape is wound onto a reel 65. The bottom plate 54 carries a plurality of setting dies 66 (similar to the setting die 12 of FIG. 1).

The tape indexing means is capable of indexing the tape at successive indexes a distance which is any required multiple of the predetermined unit spacing. Single step tape indexing is well known to the ordinary skilled person. Multiple or variable step indexing can be achieved in a number of ways, for example by driving a single step indexing mechanism through a gear box with the required range of gear ratios or by driving it with a programmable motor which can be pre-programmed to drive the indexing mechanism any required number of steps. The use of such a tape indexing mechanism allows significant economies in the amount of tape used when the spacing of the fastening points in the workpiece is greater than the minimum spacing required for mounting the fasteners in the tape.

If multiple fastening points lie in a straight line and the distance between each fastening point is a multiple of a predetermined unit spacing, the carrier tape 2 can be pre-loaded with fasteners 4 in a pattern of spacing identical to the pattern of spacing of the fastening points. If the spacing of the fastening points is not an integral multiple of a predetermined unit spacing the tape guides 60 can be used to create a path length between each of the multiple fastening points which is an integral multiple of the predetermined unit spacing.

The top plate 52 and the bottom plate 54 are held apart by springs 68 which are coiled around the guide bushes 56 to allow a fixture 70, which carries a workpiece 72, to be indexed between the top and bottom plates. Fixture 70 is not essential, but it can be advantageous to pre-load the workpieces into an assembly fixture which holds them in the required relative positions as the workpieces are carried through the fastening mechanics. The fixture may include means by which it can operate in conjunction with a fixture indexing mechanism, projections 73 of which are shown, to bring each part of the assembly of workpieces progressively into a position where fasteners can be applied at the desired fastening points. This is particularly important where workpieces require to be precisely positioned to allow fasteners to be fed into pre-formed holes. Thus, for example, indexing holes 75 in the body of the fixture can be used in cooperation with projections 73 to position the workpiece assembly at the hole piercing stage. The same indexing holes 75 can subsequently be used for fine positional adjustment at the fastener application stage either to bring the holes in the workpieces precisely into line with the plungers and dies within the guide manifold or, where the guide manifold has limited freedom to float relative to the platens of the prime mover, to bring its plungers and dies into line with the holes in the workpieces.

When the top platen 48 of the press moves downwards, the top platen applies spring pressure to the top plate 52 by way of coil springs 74 and urges the top plate 52 downwardly to bring the delivery tubes 62 into clamping contact with the workpiece 72. As the top platen 48 continues its downward movement it contacts the plungers 58 and causes the plungers each to urge a fastener 4 out of the carrier tape 2, initially into the delivery tubes 62 and thereafter into fastening engagement with the workpiece 72. Thus the plungers 58, corresponding dies 66 and fastening positions are all axially aligned. As described previously, the delivery tubes 62 provide pre-clamping of the workpiece against the dies 66 prior to fastener application.

When the top platen 48 subsequently moves upwardly, springs 68 are able to move the top plate 52 clear of the bottom plate 54 to permit the fixture 70 to be indexed to the next fastening position by a fixture indexing mechanism (not shown) and the carrier tape is also indexed to the next pattern of fasteners by the tape indexing means to bring a fastener into axial alignment with the plunger and the die at each of the selected fastening positions. Where more than one design of fastener is required for any particular workpiece, the carrier tape can be pre-loaded with an appropriate mix of different fasteners.

For fine positioning of the fasteners at the fastening points, drive wheels (not shown) which engage with the preformed location holes in the carrier tape can be provided within the guide manifold. The drive wheels can perform a dual function. The drive wheels can be driven by the indexing mechanism to bring the location holes in the carrier tapes to a precise position relative to each fastening point, and to help draw the carrier tape through the tape guides with minimal tension, and hence minimal stretching.

Where the flexible carrier tapes have a cross-sectional geometry which allows rotation around a longitudinal axis, preferably the longitudinal axis which passes through the centre-line of the tape, and allows bending around a transverse axis, preferably slightly offset from the tape, to give an acceptable radius of bend, such tapes can, if passed through suitably designed tape guides which generate a series of rotations and/or bends, transport fasteners to any desired fastening points in any plane. Such arrangements are described separately above in respect of FIGS. 1 and 2. The design of such tape guides requires no inventive ingenuity. Although by such means a single carrier tape could be used to carry fasteners to all the fastening points on a workpiece, for a relatively large number of fastening points it is preferable to use more than one tape, all of which tapes can be indexed simultaneously, as shown in FIG. 4. For example, the twin rows of rivets on trailer side walls could advantageously be fed simultaneously by two carrier tapes.

Figure 5:
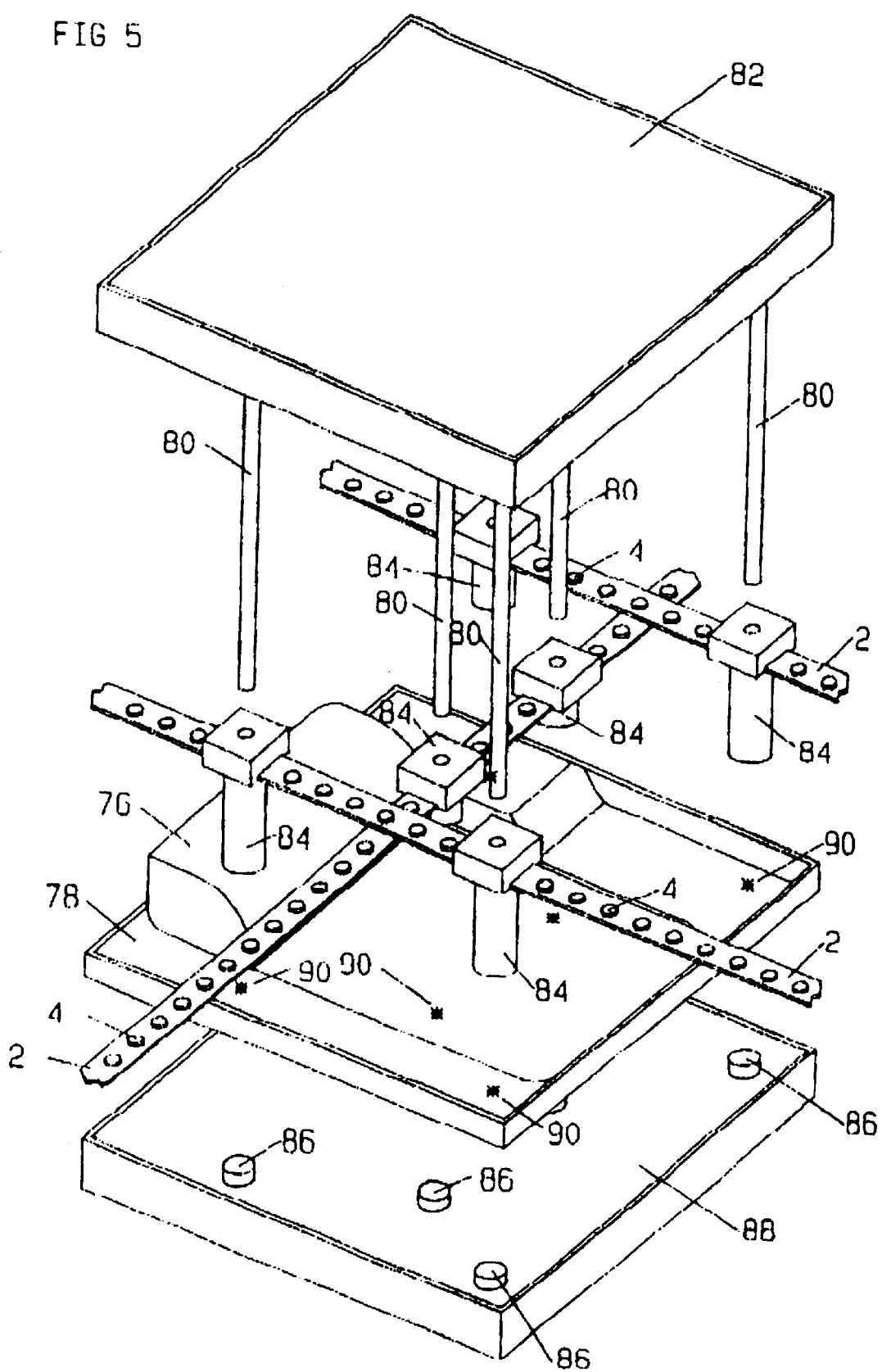
FIG. 5 illustrates the use of a multiple fastener application system according to the present invention for fastening a seat pan to seat support means.
Figure 6:
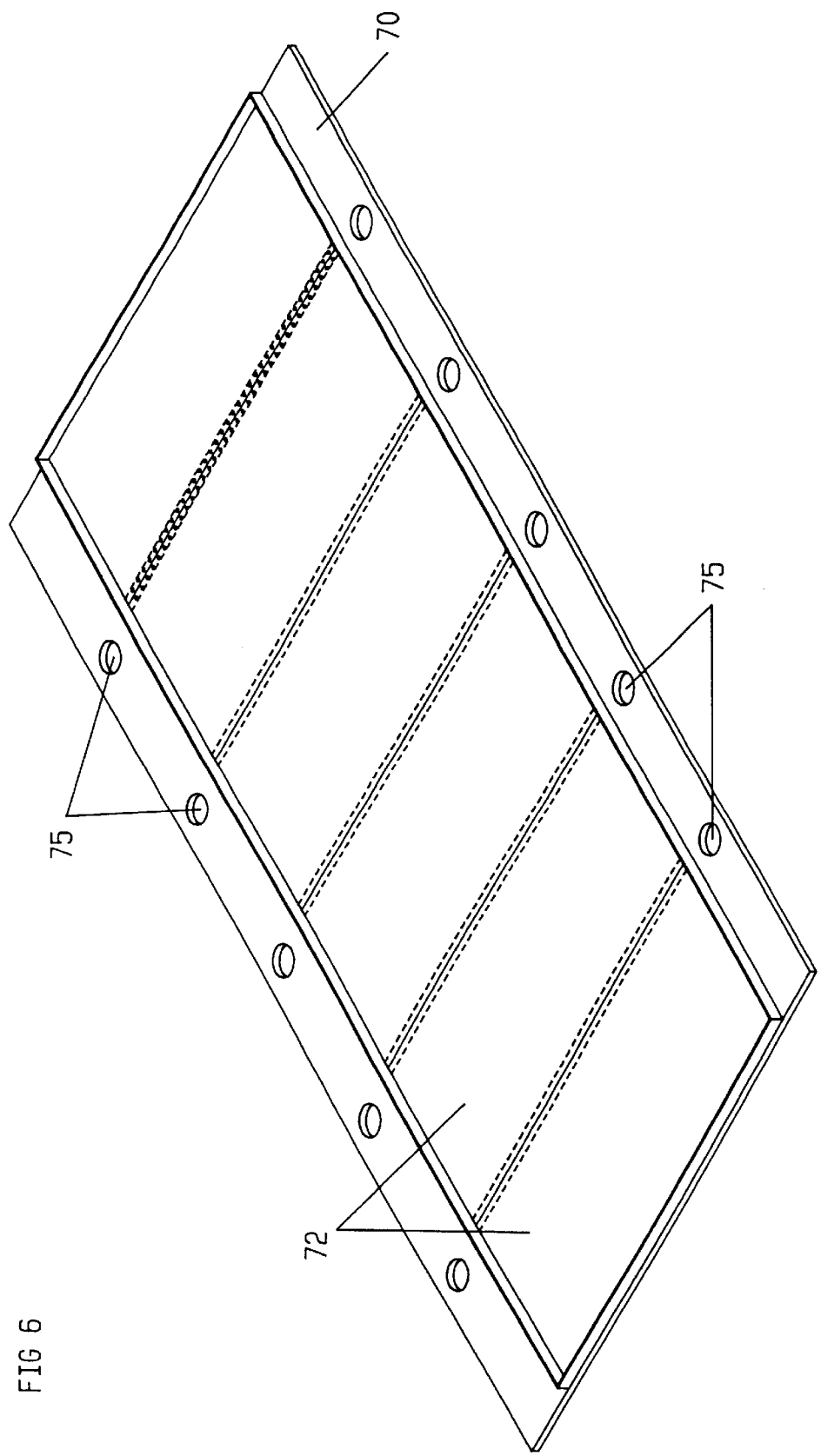
FIG. 6 is a perspective view showing a fixture carrying an assembly of workpieces.

The multiple fastener application system shown in FIG. 5 is adapted to fasten a first workpiece in the form of a seat pan 76 to a second workpiece in the form of a seat support means 78. It should be noted that the principles shown and described in relation to FIG. 5 can be applied to a wide range of workpieces. Multiple plungers 80 are mounted on a top plate 82 of a guide manifold 88 which fits, for example, between the platens of a prime mover such as a power press (not shown) which is sufficiently large to span the workpieces and is capable of applying sufficient force to set the fasteners simultaneously. Downward movement of the top plate 82 causes the plungers 80 each to move downwardly through a delivery tube 84 so as to drive a fastener 4 from a carrier tape 2 and downwardly through the tube and into fastening engagement with workpieces 76 and 78 which are supported on setting dies 86 provided on a bottom plate of the guide manifold 88 which fits on the bottom platen of the power press. Thus the plungers 80, corresponding setting dies 86 and fastening positions 90 are all axially aligned. As shown in FIG. 5, the delivery tubes 84 are of different lengths in order to reach fastening points which lie in different planes. Once the fasteners have been applied the plungers 80 are withdrawn, the workpieces 76, 78 are replaced and the carrier tapes are indexed to the next fastening positions by tape indexing mechanisms in order to bring a fastener into axial alignment with the plunger and the die at each of the fastening positions. The delivery tubes 84 provide pre-clamping of the workpiece against the dies 86 prior to fastener application.

Because the tape guide between the fastening points need not follow a minimum distance path, fasteners which are loaded into a carrier tape at predetermined unit spacing can successfully be fed to fastening points which are not spaced at the predetermined unit spacing nor at multiples of such predetermined unit spacing. By deviating from the minimum distance path, the tape guides can provide a path between any two fastening points, the length of which is a multiple of the predetermined unit spacing. Hence, where the fastening points are not naturally at multiples of the predetermined unit spacing, the tape guides have a secondary role of increasing path length to the next highest multiple of the predetermined unit spacing.

In order to ensure accurate alignment of the plungers and dies with the fastening positions, the guide manifold may be mounted on a prime mover in a manner which permits limited positional freedom relative to the prime mover. This enables the guide manifold to engage positioning means to bring the plungers and dies into precise axial alignment with the fastening positions.

In certain applications the plurality of plungers can be mounted directly on the top platen of the prime mover, the setting dies can be mounted directly on the bottom platen of the prime mover, and fasteners can be discharged from the carrier tape directly without passing through delivery tubes.

What is claimed is:

1. An apparatus for simultaneously applying multiple fasteners to a workpiece, the fasteners being carried by a flexible carrier tape and being spaced along the length of the tape at an integral multiple of a predetermined unit spacing, wherein the apparatus comprises a guide manifold which includes:

a top plate incorporating a plurality of spaced fastening stations, each fastening station comprising a plunger which is axially aligned with a respective fastening position and a fastener delivery tube for conducting a fastener from the carrier tape to the respective fastening position;

at least one tape guide adapted to guide the tape to successive fastening stations along a path adapted and arranged such that a path length for the tape between each pair of fastening stations is a distance corresponding to an integral multiple of the predetermined unit spacing; and tape indexing means adapted to index the tape a sequence of distances each of which is an integral multiple of the predetermined unit spacing so as to bring a fastener carried by the tape simultaneously into axial alignment with the respective fastener delivery tube at each of the fastening stations.

2. An apparatus according to claim 1 and including a bottom plate provided with a plurality of dies which are axially aligned with the plurality of fastening positions.

3. An apparatus according to claim 2, wherein the bottom plate is mounted on a bottom platen of a power press.

4. An apparatus according to claim 1, wherein the top plate is adapted for movement with a top platen of a power press.

5. An apparatus according to claim 1, wherein the tape indexing means is adapted to index the carrier tape at successive indexes by a sequence of indexing distances each of which is a multiple of the predetermined unit spacing.

6. An apparatus as claimed in claim 1, wherein the fastening positions lie substantially in a straight line.

7. An apparatus as claimed in claim 1, wherein clamping means is provided for pre-clamping the workpiece prior to fastener application.

8. An apparatus according to claim 1, wherein the guide manifold is mounted on a prime mover in a manner which permits limited positional freedom relative to the prime mover, whereby the guide manifold can engage positioning means on at least one of the workpiece and a workpiece fixture to bring the plungers into precise axial alignment relative to the fastening positions.

9. An apparatus according to claim 1, wherein the plungers are adapted to urge the fasteners from the carrier tape into delivery tubes for guiding the fasteners to the required fastening positions.

10. An apparatus according to claim 9, wherein the delivery tubes incorporate an axially continuous longitudinal constriction to restrain the fasteners from free-fall and for preserving a desired fastener orientation.

11. An apparatus according to claim 9, wherein the delivery tubes are adapted to receive the fasteners head-first from the carrier tape.

12. An apparatus according to claim 9, wherein the guide manifold incorporates an aperture between the delivery tubes and the dies to permit the passage of a workpiece with sufficient clearance to allow the workpiece to be lifted clear of the dies after the fasteners have been applied.

13. An apparatus for simultaneously applying multiple fasteners to a workpiece, the fasteners being pre-loaded in a flexible carrier tape and being spaced along the length of the tape at an integral multiple of a predetermined unit spacing, comprising:

means for defining a plurality of spaced fastening stations, each fastening station comprising a plunger which is axially aligned with a respective fastening position and a fastener delivery tube for conducting a fastener from the carrier tape to the respective fastening position;

a guide for passage of the carrier tape, the guide being adapted to guide the tape to successive fastening stations along a path adapted and arranged such that a path length for the tape between each pair of fastening stations is a distance corresponding to an integral multiple of the predetermined unit spacing; and indexing means adapted to index the tape a sequence of distances each of which is an integral multiple of the predetermined unit spacing for bringing simultaneously a fastener mounted on the carrier tape into axial alignment with said plunger at said plurality of fastening stations.

14. The apparatus of claim 13 further comprising a guide manifold which includes a top plate having said plurality of plungers mounted therein.

15. An apparatus according to claim 1, wherein the guide manifold is mounted on a prime mover whereby the guide manifold can engage positioning means on at least one of the workpiece and a workpiece fixture to bring the fastening positions into precise axial alignment relative to the plungers.

16. An apparatus according to claim 1, wherein the guide manifold is mounted on a prime mover in an manner which permits limited positional freedom relative to the prime mover, whereby the guide manifold can engage positioning means on at least one of the workpiece and a workpiece fixture to bring the plungers and dies co-operable therewith into precise axial alignment relative to the fastening positions.

17. An apparatus according to claim 1, wherein the guide manifold is mounted on a prime mover whereby the guide manifold can engage positioning means on at least one of the workpiece and a workpiece fixture to bring the fastening positions into precise axial alignment relative to the plungers and dies co-operable therewith.

* * * * *